United States Patent [19]

Cason, Jr.

[11] 4,182,394

[45] Jan. 8, 1980

[54] ROTARY ROCK BIT BEARING PIN HARDFACING METHOD AND APPARATUS

[75] Inventor: George A. Cason, Jr., Dallas, Tex.

[73] Assignee: Dresser Industries, Inc., Dallas, Tex.

[21] Appl. No.: 939,631

[22] Filed: Sep. 5, 1978

[51] Int. Cl.² .................... B22D 19/08; B22D 25/02
[52] U.S. Cl. ......................................... 164/4; 164/98; 164/154; 164/105; 164/51
[58] Field of Search ................. 164/4, 80, 92, 98, 103, 164/105, 107, 154, 155, 150; 425/143, 144

[56] References Cited

U.S. PATENT DOCUMENTS

| | | | |
|---|---|---|---|
| 2,358,090 | 9/1944 | Longoria | 164/105 X |
| 3,555,597 | 1/1971 | Meadows | 425/144 X |
| 3,794,100 | 2/1974 | Raymond et al. | 164/105 X |
| 4,150,281 | 4/1979 | Hinz | 425/144 X |

*Primary Examiner*—Robert D. Baldwin
*Assistant Examiner*—Gus T. Hampilos

[57] ABSTRACT

A rotary rock bit bearing is produced by filling a groove in the bearing pin of the bit with a hardfacing material. A crucible is positioned around the bearing pin. Hardfacing material is positioned in the crucible. A heating means for heating said crucible is positioned around the crucible and energized. A temperature sensitive primary control means for controlling said heating means is operatively connected to said crucible. A temperature sensitive secondary control means for controlling said heating means is operatively connected to the bearing pin ball bearing raceway flange. The primary control means is operative during the first portion of the hardfacing operation and the secondary control means is operative during the second portion of the hardfacing operation.

5 Claims, 2 Drawing Figures

ROTARY ROCK BIT BEARING PIN HARDFACING METHOD AND APPARATUS

TECHNICAL FIELD

The present invention relates to the art of earth boring and, more particularly, to a system for constructing a rotary rock bit for drilling oil and gas wells and the like.

BACKGROUND OF THE INVENTION

In drilling for oil and gas a rotary rock bit is threaded on the lower end of a rotary drill string. The drill string is lowered into the borehole and rotated, causing the bit to rotate and disintegrate the formations at the bottom of the borehole. These boreholes extend many thousands of feet into the earth and very often they extend many miles into the earth. When the rock bit fails, the entire drill string must be pulled from the borehole to replace the bit. The operation of pulling the drill string involves uncoupling the drill pipe sections that make up the drill string and stacking them in the rig. A new bit is substituted for the bit that failed and the sections of drill pipe are recoupled and lowered into the borehole until the bit is again in position for drilling. Such "round trips" of the drill string require substantial time and effort of the drilling crew and no actual progress is made in extending the borehole into the earth. The round trip time required to change a bit varies on an average of from 0.6 hour to 1 hour for every 1000 feet of borehole drilled. For a 10,000 foot well, 6-10 hours are required to change a bit. In deeper drilling the round trip time is, of course, greater. With operating expenses of the rig ranging from $70.00 to $400.00 per hour, the expense of changing a bit is substantial. The expenses of offshore drilling rigs are much greater. In addition, round trips present hazards to the crew and to the borehole and cause severe wear on the expensive drilling equipment. A reduction of the frequency and number of round trips while drilling is of critical economic importance in drilling. By increasing the quality, strength and performance of the drill bit, the number of round trips can be reduced.

In the prior art induction rock bit bearing hardfacing process, rework and scrappage is caused by variations in the temperature of the arm ball bearing raceway flange. The prior art process controls the temperature of a carbon crucible based upon the temperature of the crucible above the induction coil throughout the process and leaves the final temperature of the ball bearing raceway flange dependent upon magnetic flux density and time. The present invention controls the total energy applied to the ball bearing raceway flange and the final or maximum temperature it can reach.

DESCRIPTION OF PRIOR ART

In induction rock bit bearing hardfacing process has been in secret use by Dresser Industries, Inc., Dallas, Texas for a number of years. The system comprises heating a rock bit bearing pin and filling a groove in the bearing pin with hardfacing material. The process controls the temperature of a carbon crucible above an induction coil throughout the process and leaves the final temperature of the ball bearing raceway flange dependent upon magnetic flux density and time.

In U.S. Pat. No. 2,831,661 to G. R. Brown, patented Apr. 22, 1958, a drill bit consisting of three segmental elements which are adapted to fit together to constitute a bit is shown. After forging, the segmental elements are machined to afford accurately meeting surfaces when the elements are assembled together. The margins which represent the meeting of the segments are given a chamfer for providing a weld groove. The three segmental elements are assembled in a jig and welding is carried out along the groove.

In U.S. Pat. Nos. 3,823,030 and 3,915,514 to Lester S. Hudson, a bearing system having entrained wear-resistant particles is shown. A rock bit bearing system is provided by filling a groove in the bearing pin of the bit with a deposit including a multiplicity of tungsten carbide particles in a high temperature resistant metal matrix. The tungsten carbide particles are introduced into the deposit using a welding rod that combines the tungsten carbide particles with hard metal welding rod materials.

SUMMARY OF THE INVENTION

The present invention provides an improved system for constructing a rotary rock bit. A crucible is positioned around a rock bit bearing pin. A hardfacing material is positioned in said crucible. The hardfacing material is melted by heating said hardfacing material and crucible so that said hardfacing material flows around said bearing pin. Control of the operation is maintained by (1) sensing the temperature of said crucible during a first time period and controlling said heating and (2) by sensing the temperature of the rock bit ball bearing raceway flange during a second time period and controlling said heating. The above and other features and advantages of the present invention will become apparent from a consideration of the following detailed description of the invention when taken in conjunction with the accompanying drawings.

DETAILED DESCRIPTION OF THE INVENTION

The prior art rock bit bearing induction hardfacing process creates rework and scrappage caused by variations in the temperature of the bearing pin ball bearing raceway flange. The prior art process controls the temperature of the carbon crucible above the induction coil throughout the process and leaves the final temperature of the ball race flange dependent upon magnetic flux density and time. The present invention controls the total energy applied to the ball bearing raceway flange and the final or maximum temperature it can reach. A dual temperature control system is provided so that the output of the induction generator can be controlled by the temperature of the carbon crucible during the preheat portion of the cycle and by the temperature of the ball bearing raceway flange during a predetermined portion of the heating cycle.

The automatic hardfacing of a rotary rock bit bearing pin is a casting operation in which the parent metal or surface to receive the hardfacing alloy, is preheated by an induction heating process. A hardfacing alloy is contained by a carbon mold or crucible and brought to melting temperature by use of an oxy-acetylene torch.

As the hardmetal melts, it flows down through gates in the bearing pin completely filling the preheated groove in the bearing pin. This results in greatly reduced manufacturing cost by eliminating the time consuming manual application and providing minimum grinding stock allowance.

Figure 1:
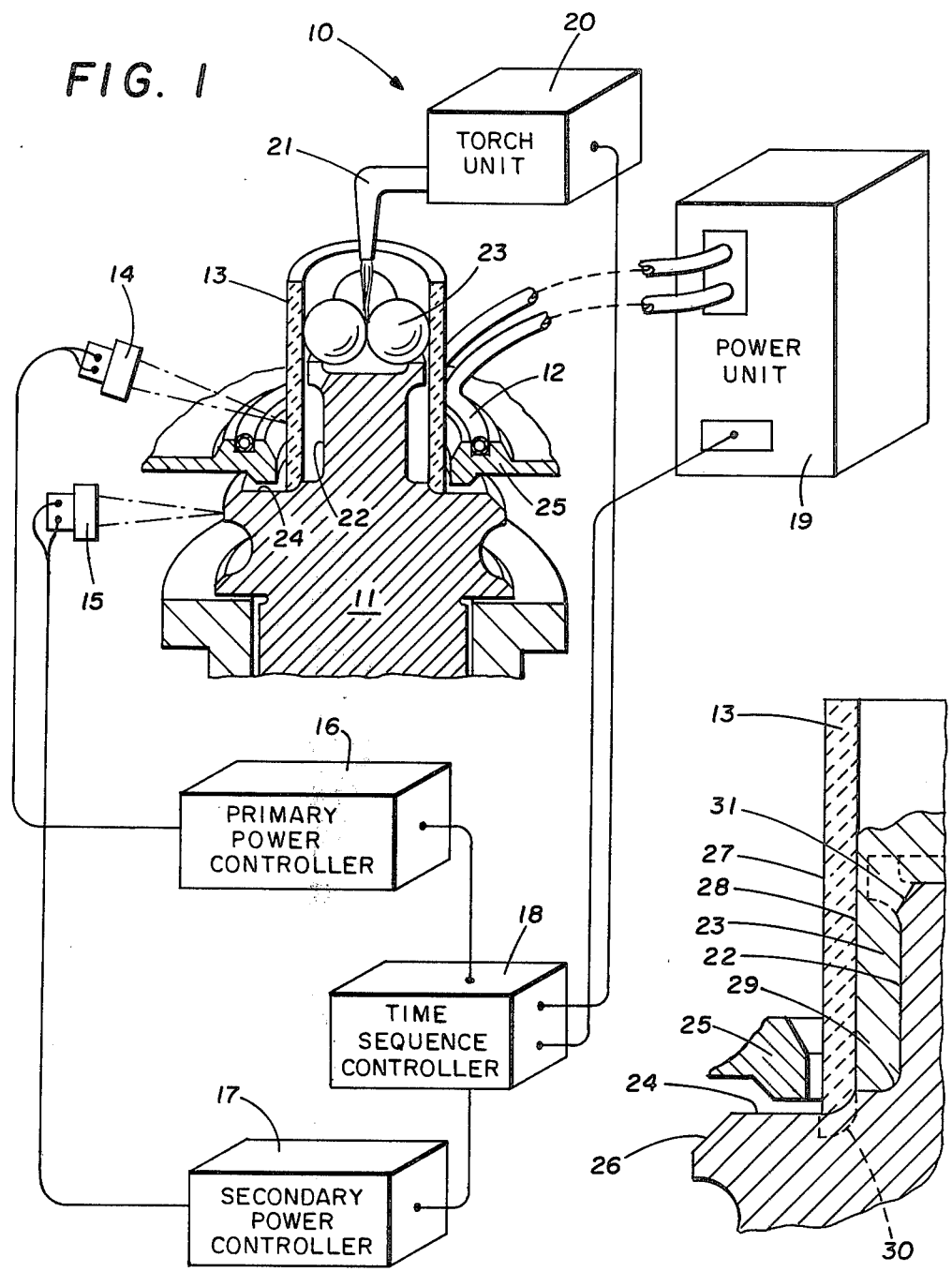
FIG. 1 illustrates a system for hardfacing a bearing pin of a rotary rock bit according to the present invention.

Referring now to the drawings and in particular to FIG. 1, a system of hardfacing the bearing pin of a rotary rock bit according to the present invention is illustrated. The overall system is designated generally by the reference number 10. When completed, the bit will be adapted to be connected to a rotary drill string by a threaded connection and used for drilling well bores and the like. A rotatable cone cutter will be mounted on bearing pin 11 and adapted to rotate as the bit contacts the earth formations. Cutting structure on the exterior surface of the rotatable cone cutter disintegrates the earth formations.

A cross section of a portion of the bearing pin 11 is shown in FIG. 1. A groove 22 is formed in the bearing pin 11. The groove 22 will be filled with a deposit to form a journal bushing. This deposit is formed from the hardfacing material 23. The hardfacing material 23 will be bonded to the metal matrix of the bearing pin 11. The journal bushing will be machined to form a finished bearing surface. The finished bearing surface will be a journal bushing; however, it is to be understood that other types of bearing surfaces are contemplated by the present invention.

The hardfacing is applied to the bearing pin's pilot pin area in an automatic casting operation. The surface area 22 that is to receive hardmetal is grooved to a radial depth of approximately 3/32". The groove 22 provides a dam at both the inner and outer extremeties of the pilot pin. The outermost dam is notched to provide a conducting gate through which molten hardmetal can flow.

A thin wall carbon crucible 13 is positioned around the O.D. of the pilot pin portion of bearing pin 11 and seated against the inner ball bearing raceway flange 24. The crucible 13 is made long enough to extend beyond the upper end of the pilot pin to form a ladel to hold the melt of hardfacing material. The carbon crucible 13 is placed on the bearing pin 11 and the alloy 23 to be melted is placed in the open end of the crucible 13. The entire arm section of the bit containing bearing pin 11 is placed in an elevating fixture with the axis of the bearing pin 11 in a vertical position. A high frequency induction generator 19 is used to preheat the surfaces that are to receive the hardmetal. Eddy currents are induced by an electrical conductor 12.

A water-cooled oxy-acetylene torch 21 is positioned about 1⅛" above the end of the bearing pin 11 and adjusted for a 3×flame. During the melt down portion of the cycle, this torch is made to oscillate in a small orbital path to facilitate even distribution of heat.

The groove 22 must be raised to sweating temperature as the hardfacing material 23 melts and flows downward to fill the groove 22. This will insure a full and complete bonding of the hardfacing material to the bearing pin 11. The precise temperature is critical. The flowing of the melting hardfacing material 23 along the inside of the carbon crucible 13 creates a heat sink effect on the inside of the carbon crucible 13. Generally, approximately at 25° F. temperature differential exists between the outside temperature of the carbon crucible 13 measured by the radiation pyrometer 14 and the inside of the carbon crucible 13.

Electrical current flowing through the coil 12 causes electromatic heating. A primary infrared radiation pyrometer 14 is focused on the surface of the carbon crucible 13 at a point approximately ⅛" above the induction coil 12. The radiation pyrometer 14 produces an electrical voltage proportional to the temperature of the surface being monitored. A secondary infrared radiation pyrometer 15 is focused on the surface of the ball bearing raceway flange 24. The secondary radiation pyrometer 15 also produces an electrical voltage proportional to the temperature of the surface being monitored.

It is extremely important that the temperature of the ball race flange 24 not become too high. If the temperature on the flange 24 becomes too high, the surface melts and the bearing pin can be ruined. Also, if the temperature on the ball race flange becomes to high, the carbon crucible 13 will actually sink into the surface and leave a groove in the flange 24 that cannot be removed and the bearing pin 11 is ruined.

The entire process is controlled in three automatically sequenced intervals. In interval one, the R.F. induction generator 19 is turned on. Current flowing through the coil 12 creates an electromagnetic field which induces eddy current flow in the carbon crucible 13 thus heating the crucible 13 to the desired temperature. In interval two, the oxygen and acetylene flows to the torch 21 and auto ignition of the torch occurs due to the exposure of the acetylene gas to the heated carbon crucible 13. The R.F. generator is held on during this time period to maintain the desired surface temperature of the pilot-pin parent metal. In interval three, the R.F. generator output power control is switched from the primary controller 16 to secondary controller 17 at the desired point in the process cycle.

The hardmetal application process is extremely temperature-time dependent. Heating of the bonding surfaces results from eddy current flow, radiation and conduction. Eddy currents induced in the surface of the carbon mold by the presence of the electromagnetic field surrounding the induction coil 12 cause rapid heating of the surface due to the $I^2R$ losses in this high resistance material. Radiant energy emitted by the I.D. of the carbon mold flows across the cavity in the mold to the bonding surface, and heat is conducted to the radius at the base of the pilot pin due to the contact pressure of the mold resting on this surface.

It has been found that by maintaining a thermal gradient between the O.D. of the carbon mold 13 and the bonding surface in the pilot pin groove 22 of between 100° F. and 200° F. that the bonding surface will reach the desired temperature in 20 to 30 seconds.

Figure 2:
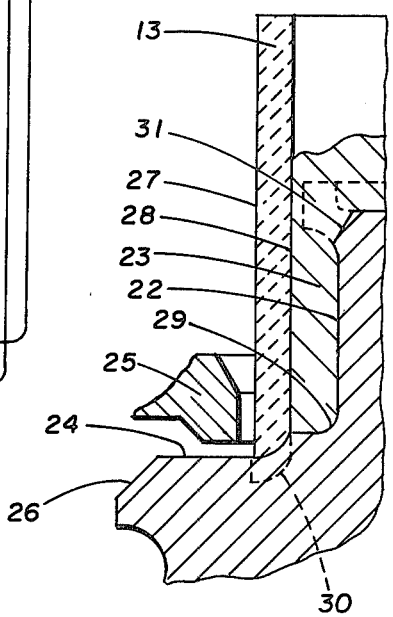
FIG. 2 is an enlarged view of a portion of the system shown in FIG. 1.

Referring now to FIG. 2, an enlarged view of a portion of the carbon mold 13 and the pilot pin area of bearing pin 11 is shown. Typical process temperature at the various points are as follows: the carbon O.D. at the primary control point 27 is typically 2425° F., the I.D. of the mold 28 is somewhat less (the actual temperatures difference is not known but is believed to be about 25° F.), and the sweating temperature of the bonding surface 22 is to a degree dependent upon the carbon absorption at the surface but must be held at a somewhat higher temperature than the melting point of the hardfacing alloy, for example, 2250° F.

With the entire mold cavity maintained at a temperature higher than the melting point of the hardfacing alloy 23, the alloy that reaches a molten state from the heat of the oxy-acetylene torch above will flow into the cavity and remain in a liquid state until all of the material has been melted and the cycle has been completed. While flowing into the mold cavity, the molten alloy comes in contact with the inside diameter of the mold causing a chilling effect due to the 150° F. difference in temperature between the surface of the carbon and the molten alloy material.

The primary power controller 16 responds to this change in temperature by commanding more power output from the R.F. generator 19 in an effort to maintain the O.D. 27 of the carbon mold 13 at the set point temperature. Since both the mass and the location of the hardmetal 23 change relative to the torch 21 tip and the flame temperature vary from part to part, the time at which the chilling occurs is an uncontrolled process variable.

The addition of excess R.F. power near the end of the process cycle would normally result in a higher temperature at the base of the pilot pin and of the ball race flange 24. A controlled amount of additional power added at precisely the same time near the end of the cycle is desirable to insure a perfect bond at the critical tie-in point at the lower radius 29 of the hardmetal groove in the pilot pin. However, the chilling effect of the hardmetal contacting the I.D. 27 of the carbon crucible 13 would normally result in full power being delivered at random time intervals causing either poor tie-ins at the base of the pilot pin or excessive heating and melting of the ball race flange 24 at the critical control point. Poor tie-in can be repaired by expensive hand welding rework operations, but melting of the surface at the critical control point would allow the carbon mold 13 to sink into the surface forming a groove 30 that will not clear up in the final grinding operation, thereby producing a scrap part.

The present invention eliminates the effects of the process variable described above by the addition of the secondary power controller 17 at a point in the cycle just prior to the earliest expected time that the molten hardmetal 23 would normally reduce the temperature of the carbon mold 13. The generator 19 power output control is switched from the primary power controller 16 to the secondary power controller 17 and the temperature monitoring optical pyrometer 15 senses the temperature on the ball race flange. The setpoint temperature for this secondary power controller 17 is usually 200° F. to 300° F. lower than the O.D. 27 of the carbon mold 13 depending on the diameter of the flange 24 and the resultant thermal gradient between the O.D. of the flange and the critical control point at the base of the pilot pin.

The embodiments of the invention in which an exclusive property or privilege is claimed are defined as follows:

1. A method of hardfacing a rotary rock bit bearing pin, comprising the steps of:
   providing a rotary rock bit bearing pin;
   positioning a crucible around said rotary rock bit bearing pin to cooperate with said rotary rock bit bearing pin to define a mold cavity;
   placing hardfacing material in said crucible;
   heating said hardfacing material and crucible so that said hardfacing material flows into said mold cavity and around at least a portion of said rotary rock bit bearing pin;
   controlling said heating by sensing the temperature of said crucible during a portion of said heating; and
   controlling said heating by sensing the temperature of said rotary rock bit bearing pin during another portion of said heating.

2. A method of hardfacing a rotary rock bit bearing pin, comprising the steps of:
   providing a rotary rock bit bearing pin;
   forming a groove in said rotary rock bit bearing pin;
   positioning a crucible around said rotary rock bit bearing pin to cooperate with said rotary rock bit bearing pin to define a mold cavity;
   placing hardfacing material in said crucible;
   heating said hardfacing material and crucible so that said hardfacing material flows into said mold cavity around said rotary rock bit bearing pin and into said groove;
   controlling said heating by sensing the temperature of said crucible during a portion of said heating; and
   controlling said heating by sensing the temperature of said rotary rock bit bearing pin during another portion of said heating.

3. A method of hardfacing a rotary rock bit bearing pin, said rotary rock bit bearing pin having a pilot pin portion and a ball bearing raceway flange portion, comprising the steps of:
   providing a rotary rock bit bearing pin having a pilot pin portion and a ball bearing raceway flange portion;
   forming a groove in said pilot pin portion;
   positioning a crucible around said pilot pin portion, said crucible resting on said ball bearing raceway flange portion to cooperate with said rotary rock bit bearing pin to define a mold cavity;
   placing hardfacing material in said crucible;
   heating said hardfacing material and crucible so that said hardfacing material flows into said mold cavity and around said pilot pin portion;
   sensing the temperature of said crucible during a first portion of said heating;
   controlling said heating based upon the sensed temperature of said crucible during said first portion of said heating;
   sensing the temperature of said ball bearing raceway flange portion during a second portion of said heating; and
   controlling said heating based upon the sensed temperature of said ball bearing raceway flange portion during said second portion of said heating.

4. Apparatus for hardfacing a rotary rock bit bearing pin, comprising:
   a crucible adapted to cooperate with a rotary rock bit bearing pin to define a mold cavity;
   a heating means associated with said crucible for heating said crucible;
   a temperature sensitive primary control means for sensing the temperature of said crucible and for controlling said heating means during a portion of the heating in response to the sensed temperature of said crucible, said primary control means operatively associated with said crucible; and
   a temperature sensitive secondary control means for sensing the temperature of said rotary rock bit bearing pin and for controlling said heating means during another portion of the heating in response to the sensed temperature of said rotary rock bit bearing pin, said secondary control means operatively associated with said rotary rock bit bearing pin.

5. Apparatus for hardfacing a rotary rock bit bearing pin, comprising:

a crucible adapted to cooperate with a rotating rock bit bearing pin to define a mold cavity;

a heating means associated with said crucible for heating said crucible;

a primary control means for controlling said heating means during a portion of the heating of said crucible in response to the temperature of said crucible;

primary temperature sensing means operatively connected to said crucible and to said primary control means for sensing the temperature of said crucible and transmitting a signal indcating said sensed temperature to said primary control means;

a secondary control means for controlling said heating means during another portion of the heating of said crucible in response to the temperature of said rotary rock bit bearing pin; and secondary temperature sensing means adapted to be associated with said rotary rock bit bearing pin and operatively connected to said secondary control means for sensing the temperature of said rotary rock bit bearing pin and transitting a signal indicating said rotary rock bit bearing temperature to said secondary control means.

* * * * *